US012453474B2

(12) United States Patent
Ishii

(10) Patent No.: US 12,453,474 B2
(45) Date of Patent: Oct. 28, 2025

(54) MEDICAL IMAGE PROCESSING APPARATUS

(71) Applicant: CANON MEDICAL SYSTEMS CORPORATION, Otawara (JP)

(72) Inventor: Hideaki Ishii, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 10 days.

(21) Appl. No.: 18/317,371

(22) Filed: May 15, 2023

(65) Prior Publication Data

US 2023/0363642 A1 Nov. 16, 2023

(30) Foreign Application Priority Data

May 16, 2022 (JP) ................................. 2022-080137

(51) Int. Cl.
*A61B 5/00* (2006.01)

(52) U.S. Cl.
CPC ...... *A61B 5/004* (2013.01); *A61B 2560/0223* (2013.01)

(58) Field of Classification Search
CPC . A61B 5/004; A61B 2560/0223; A61B 6/505; A61B 5/055; A61B 2576/00; G06T 3/047; G06T 7/0012; G06T 7/73; G06T 2207/20084
See application file for complete search history.

(56) References Cited

U.S. PATENT DOCUMENTS

| 10,318,839 B2* | 6/2019 | Gupta | A61C 7/002 |
|---|---|---|---|
| 2009/0226060 A1* | 9/2009 | Gering | G06T 7/174 |
| | | | 382/128 |
| 2010/0260400 A1* | 10/2010 | Bernhardt | A61B 6/504 |
| | | | 382/131 |
| 2017/0027533 A1 | 2/2017 | Sakaguchi | |
| 2017/0060253 A1* | 3/2017 | Kang | G06T 15/08 |
| 2017/0319164 A1* | 11/2017 | Tsukagoshi | G06T 7/75 |
| 2017/0319166 A1* | 11/2017 | Goto | A61B 6/488 |
| 2018/0116620 A1* | 5/2018 | Chen | G06T 7/136 |
| 2018/0184997 A1* | 7/2018 | Tsukagoshi | A61B 6/469 |
| 2023/0097224 A1* | 3/2023 | Genghi | G06T 7/10 |
| | | | 382/128 |

FOREIGN PATENT DOCUMENTS

JP 2017-023695 A 2/2017

OTHER PUBLICATIONS

Bishop, C. "Pattern Recognition and Machine Learning" Springer, 2006, p. 225-290.

* cited by examiner

*Primary Examiner* — Baisakhi Roy
(74) *Attorney, Agent, or Firm* — Oblon, McClelland, Maier & Neustadt, L.L.P.

(57) ABSTRACT

A medical image processing apparatus includes processing circuitry. The processing circuitry extracts, from a medical image, anatomical landmarks that represent feature points of anatomical tissue that is included in the medical image, identifies a landmark group to which the extracted anatomical landmarks belong from among landmark groups in each of which a plurality of anatomical landmarks that are groped based on the anatomical tissue and relationship information that defines a physical relationship among the anatomical landmarks are associated, and corrects positions of the extracted anatomical landmarks on the medical image based on the relationship information on the identified landmark group.

15 Claims, 6 Drawing Sheets

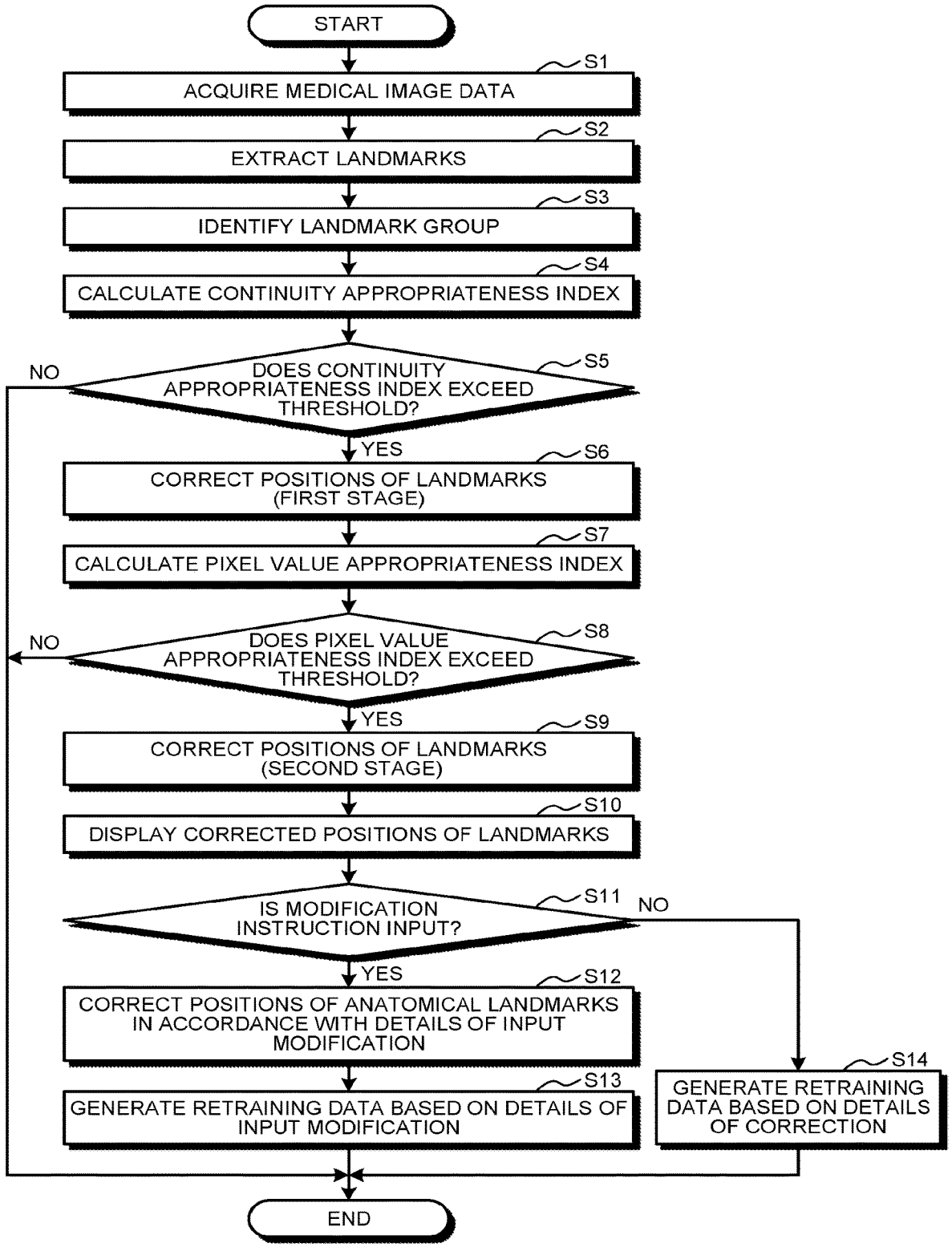

MEDICAL IMAGE PROCESSING APPARATUS

CROSS-REFERENCE TO RELATED APPLICATIONS

This application is based upon and claims the benefit of priority from Japanese Patent Application No. 2022-080137, filed on May 16, 2022, the entire contents of which are incorporated herein by reference.

FIELD

Embodiments described herein relate generally to a medical image processing apparatus.

BACKGROUND

Conventionally, a technology for extracting anatomical landmarks from a medical image that is captured by a medical image diagnostic apparatus by using machine learning (including deep learning) is known. The anatomical landmarks are, for example, local feature points that are included in anatomical tissue, such as a "lower end of a kidney" and "tips of first to twelfth ribs".

BRIEF DESCRIPTION OF THE DRAWINGS

FIG. 7 is a flowchart illustrating an example of a process performed by a medical image processing apparatus according to one embodiment.

DETAILED DESCRIPTION

A medical image processing apparatus according to one embodiment includes processing circuitry. The processing circuitry extracts, from a medical image, anatomical landmarks that represent feature points of anatomical tissue that is included in the medical image, identifies a landmark group to which the extracted anatomical landmarks belong from among landmark groups in each of which a plurality of anatomical landmarks that are groped based on the anatomical tissue and relationship information that defines a physical relationship among the anatomical landmarks are associated, and corrects positions of the extracted anatomical landmarks on the medical image based on the relationship information on the identified landmark group.

Embodiments of the medical image processing apparatus will be described in detail below with reference to the drawings.

Figure 1:
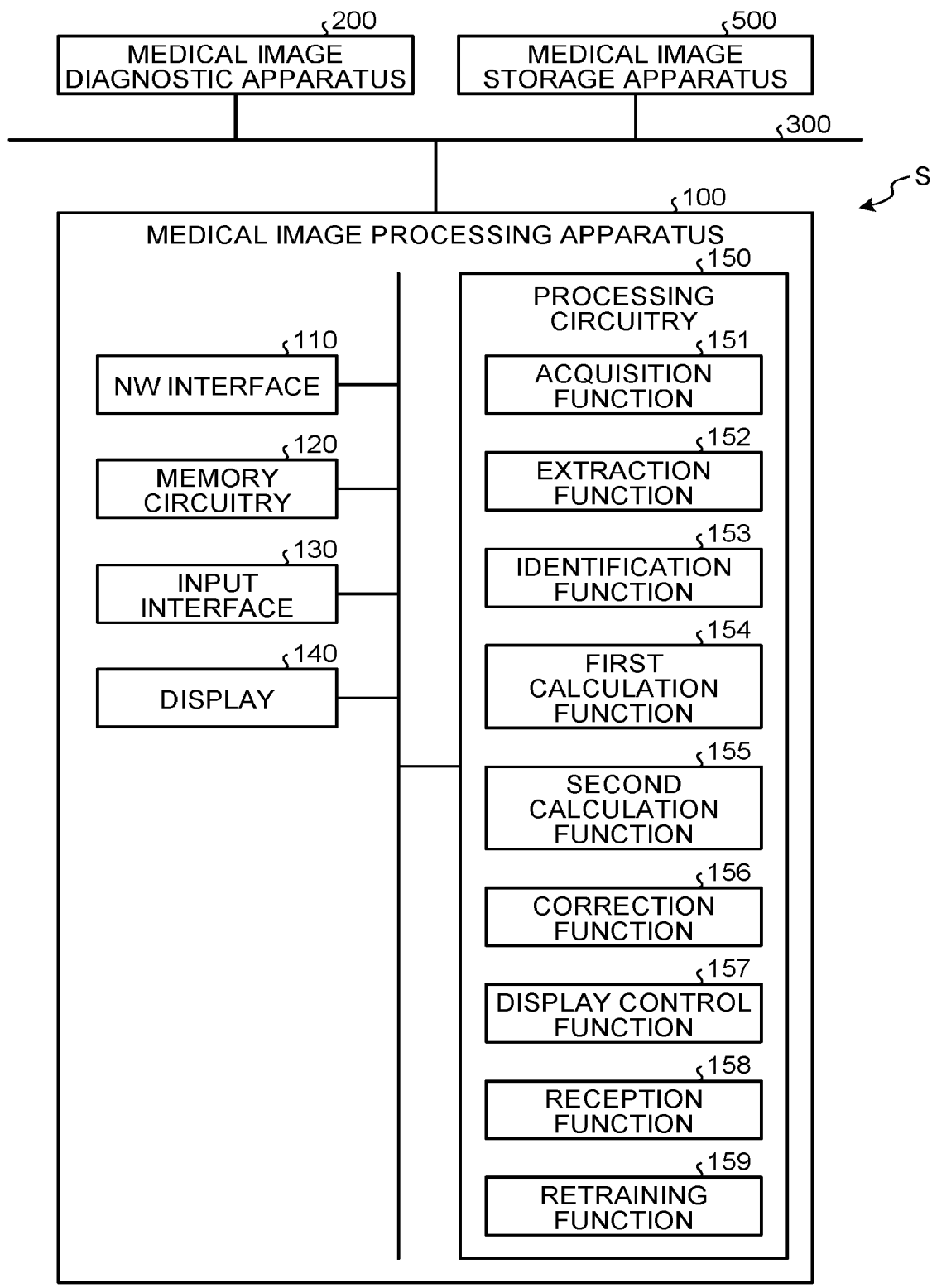
FIG. 1 is a diagram illustrating an example of an overall configuration of a medical information processing system according to one embodiment.

FIG. 1 is a block diagram illustrating an example of a configuration of a medical information processing system S according to a first embodiment. As illustrated in FIG. 1, the medical information processing system S includes a medical image processing apparatus 100, a medical image diagnostic apparatus 200, and a medical image storage apparatus 500. The medical image processing apparatus 100 is communicably connected to the medical image storage apparatus 500 via a network 300, such as an in-hospital Local Area Network (LAN).

The medical image storage apparatus 500 stores therein a medical image that is captured by the medical image diagnostic apparatus 200. Further, the medical image storage apparatus 500 stores therein data of the medical image in association with identification information (for example, a patient ID or the like) of a subject.

The medical image storage apparatus 500 is, for example, a server apparatus of a Picture Archiving and Communication System (PACS) and stores therein medical image data in a certain format that is compliant with Digital Imaging and Communication in Medicine (DICOM). The medical image is, for example, Computed Tomography (CT) image data, magnetic resonance image data, ultrasound diagnostic image data, or the like, but not limited thereto.

The medical image storage apparatus 500 is implemented by, for example, a computer apparatus, such as a Database (DB) server, and stores therein medical image data in a semiconductor memory device, such as a Random Access Memory (RAM) or a flash memory, or memory circuitry, such as a hard disk or an optical disk.

The medical image diagnostic apparatus 200 is, for example, an apparatus that captures a medical image of a subject. The medical image diagnostic apparatus 200 is, for example, a Magnetic Resonance Imaging (MRI) apparatus, an X-ray Computed Tomography (CT) apparatus, an X-ray diagnostic apparatus, an ultrasonic diagnostic apparatus, a Position Emission Tomography (PET) apparatus, a Single Photon Emission Computed Tomography (SPECT) apparatus, or the like.

However, the medical image diagnostic apparatus 200 is not limited to the apparatuses as described above. The medical image diagnostic apparatus 200 may also be referred to as a modality. Meanwhile, while the single medical image diagnostic apparatus 200 is illustrated in FIG. 1, it may be possible to arrange the plurality of medical image diagnostic apparatuses 200.

The medical image is an image of a subject that is captured by the medical image diagnostic apparatus 200. The medical image is, for example, a magnetic resonance image, an X-ray CT image, an ultrasound image, or the like. However, the medical image is not limited to the images as described above.

The medical image processing apparatus 100 is, for example, an information processing apparatus, such as a server apparatus or a Personal Computer (PC). The medical image processing apparatus 100 includes a network (NW) interface 110, memory 120, an input interface 130, a display 140, and processing circuitry 150.

The NW interface 110 is connected to the processing circuitry 150, and controls transmission and communication of various kinds of data between the medical image processing apparatus 100, the medical image diagnostic apparatus 200, and the medical image storage apparatus 500. The NW interface 110 is implemented by a network card, a network adapter, a Network Interface Controller (NIC), or the like.

The memory 120 stores therein, in advance, various kinds of information used by the processing circuitry 150. The memory 120 stores therein various kinds of information used by the processing circuitry 150. Meanwhile, the memory 120 is, for example, a storage apparatus, such as a Hard Disk Drive (HDD), a Solid State Drive (SSD), or an integrated circuitry storage apparatus.

Further, the memory 120 may be a driving apparatus that reads and writes various kinds of information between a portable storage medium, such as a Compact Disc (CD), a Digital Versatile Disc (DVD), or a flash memory, and a semiconductor device, such as a Random Access Memory (RAM), or the like.

The input interface 130 is implemented by a trackball that receives operation performed by a user, a switch button, a mouse, a keyboard, a touch pad that performs input operation by touching of an operation surface, a touch screen in which a display screen and a touch pad is integrated, contactless input circuitry using an optical sensor, voice input circuitry, or the like.

The input interface 130 is connected to the processing circuitry 150, converts input operation received from the user to an electrical signal, and outputs the electrical signal to the processing circuitry 150. Meanwhile, in the present specification, the input interface is not limited to those including a physical operating part, such as a mouse or a keyboard. For example, examples of the input interface include electrical signal processing circuitry that receives an electrical signal corresponding to input operation from an external input apparatus that is arranged separately from the subject apparatus and outputs the electrical signal to the processing circuitry 150.

The display 140 displays various kinds of information under the control of the processing circuitry 150. For example, the display 140 outputs a radiogram interpretation viewer including the medical image generated by the processing circuitry 150, a Graphical User Interface (GUI) for receiving various kinds of operation from the user, or the like. The display 140 is one example of a display apparatus.

The processing circuitry 150 is a processor that implements a function corresponding to each of programs by reading the programs from the memory 120 and executing the programs. The processing circuitry 150 of the present embodiment includes an acquisition function 151, an extraction function 152, an identification function 153, a first calculation function 154, a second calculation function 155, a correction function 156, a display control function 157, a reception function 158, and a retraining function 159.

Here, for example, each of processing functions of the acquisition function 151, the extraction function 152, the identification function 153, the first calculation function 154, the second calculation function 155, the correction function 156, the display control function 157, the reception function 158, and the retraining function 159 that are constituent elements of the processing circuitry 150 is stored in the memory 120 in the form of a computer-executable program. The processing circuitry 150 is a processor. For example, the processing circuitry 150 implements a function corresponding to each of programs by reading the programs from the memory 120 and executing the programs. In other words, the processing circuitry 150 that has read each of the programs has each of the functions illustrated in the processing circuitry 150 in FIG. 1.

Meanwhile, in FIG. 1, it is explained that a single processor implements the processing functions executed by the acquisition function 151, the extraction function 152, the identification function 153, the first calculation function 154, the second calculation function 155, the correction function 156, the display control function 157, the reception function 158, and the retraining function 159, but the processing circuitry 150 may be configured as a combination of a plurality of independent processors and implement the functions by causing each of the processors to execute the program.

Further, in FIG. 1, it is explained that the single memory 120 stores therein the program corresponding to each of the processing functions, but it may be possible to arrange a plurality of memory circuitry in a distributed manner and cause the processing circuitry 150 to read the corresponding program from the individual memory circuitry.

In the explanation as described above, the example has been explained in which the "processor" reads the program corresponding to each of the functions from the memory circuitry and executes the read program, but embodiments are not limited to this example. The term "processor" indicates, for example, a Central Processing Unit (CPU), a Graphics Processing Unit (GPU), an Application Specific Integrated Circuit (ASIC), a programmable logic device (for example, Simple Programmable Logic Device (SPLD), a Complex Programmable Logic Device (CPLD), and a Field Programmable Gate Array (FPGA)), and the like.

If the processor is, for example, a CPU, the processor implements the functions by reading programs stored in the memory circuitry and executing the programs. In contrast, if the processor is an ASIC, the programs are not stored in the memory 120, but the functions are directly incorporated, as logical circuitry, in circuitry of the processor.

Meanwhile, each of the processors of the present embodiment need not always be configured as single circuitry for each of the processors, but it may be possible to construct a single processor by combining a plurality of independent circuitry and implement corresponding functions. Further, it may be possible to integrate the plurality of constituent elements illustrated in FIG. 1 into a single processor and implement corresponding functions.

The acquisition function 151 acquires a medical image in which a subject is captured from the medical image storage apparatus 500 via the network 300 and the NW interface 110. Meanwhile, the acquisition function 151 may acquire the medical image from the medical image diagnostic apparatus 200.

For example, the acquisition function 151 acquires a medical image corresponding to a patient ID of a subject to be diagnosed from the medical image storage apparatus 500.

The extraction function 152 extracts an anatomical landmark that represents a local feature point included in anatomical tissue from medical image data IG that is acquired by the acquisition function 151. For example, the extraction function 152 extracts the anatomical landmark based on anatomical information.

The anatomical information is, for example, information on a position of a feature point related to anatomical tissue, such as a bone or an organ. The anatomical information may also be referred to as anatomical landmark information. The anatomical landmark is, for example, a local feature point that is included in the anatomical tissue, such as a "lower end of a kidney" or "tips of first to twelfth ribs".

As a method of extracting the anatomical landmark, a well-known image processing technique is applicable. For example, the extraction function 152 inputs a medical image to a landmark extraction model (one example of the anatomical information), and extracts an anatomical landmark based on an output result.

The landmark extraction model is, for example, a trained model that outputs coordinate information on an anatomical landmark and identification information on the anatomical landmark (hereinafter, also referred to as a label) upon input of the medical image. For example, the landmark extraction model is generated by an external training apparatus. Meanwhile, the medical image processing apparatus 100 may generate the landmark extraction model.

Further, in the present embodiment, it is assumed that the landmark extraction model is stored in a storage apparatus that is included in an external workstation or the like; however, the landmark extraction model may be stored in the memory 120.

Figure 2:
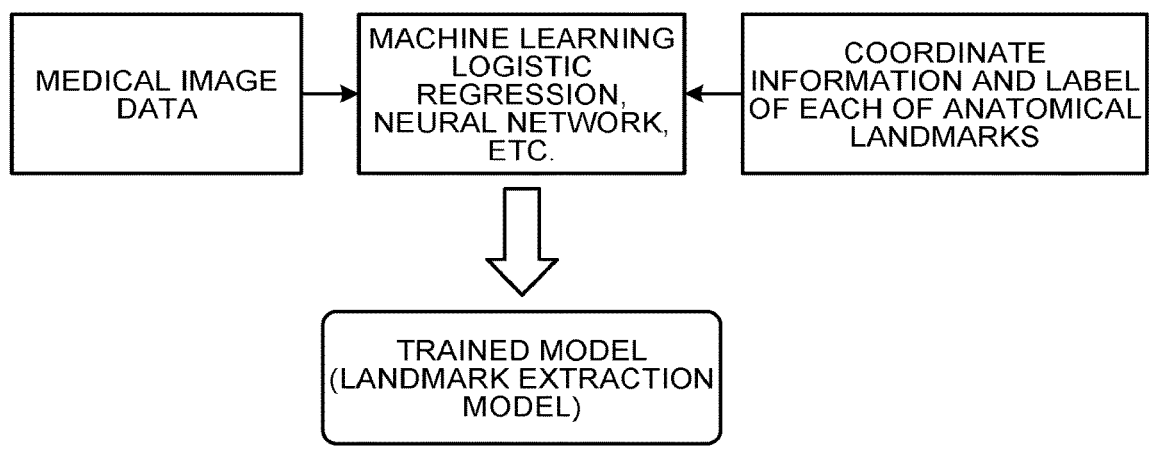
FIG. 2 is an explanatory diagram illustrating an example of a method of generating a landmark extraction model by machine learning according to one embodiment.

A method of generating the landmark extraction model will be described below. For example, the training apparatus generates a landmark model by performing machine learning (including deep learning). FIG. 2 is an explanatory diagram illustrating an example of the method of generating the landmark extraction model by machine learning.

For example, as illustrated in FIG. 2, the training apparatus inputs "medical image data", which is input-side teacher data and "coordinate information and a label of each of anatomical landmarks in the medical image" that is output-side teacher data as a training data set to a machine learning engine and performs machine learning, so that a landmark extraction model (trained model) is generated that is functioned to output the coordinate information and the label of each of the anatomical landmarks in the medical image in accordance with input of the medical image data.

Here, as the machine learning engine, for example, a Neural Network described in well-known Non-Patent Literature "Christopher M. Bishop, "Pattern recognition and machine learning", (United States of America), First Edition, Springer, 2006, P. 225-290" or the like may be applicable.

Meanwhile, as for the machine learning engine, it may be possible to apply, for example, various kinds of algorithms, such as deep learning, Logistic regression analysis, nonlinear discriminant analysis, Support Vector Machine (SVM), Random Forest, or Naive Bayes, in addition to the neural network as described above.

Figure 3:
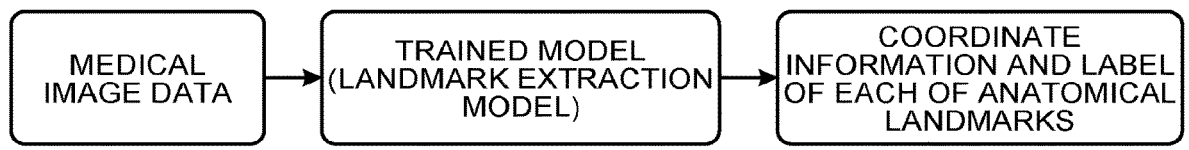
FIG. 3 is a diagram for explaining an example of a method of extracting anatomical landmarks by using a trained model according to one embodiment.

FIG. 3 is a diagram for explaining an example of a method of extracting anatomical landmarks by using a trained model. For example, as illustrated in FIG. 3, the extraction function 152 inputs the medical image data that is acquired by the acquisition function 151 to the landmark extraction model (trained model). Then, the extraction function 152 extracts an anatomical landmark based on the coordinate information and the label of the anatomical landmark that is present in the input medical image data, where the coordinate information and the label are output from the landmark extraction model.

Figure 4:
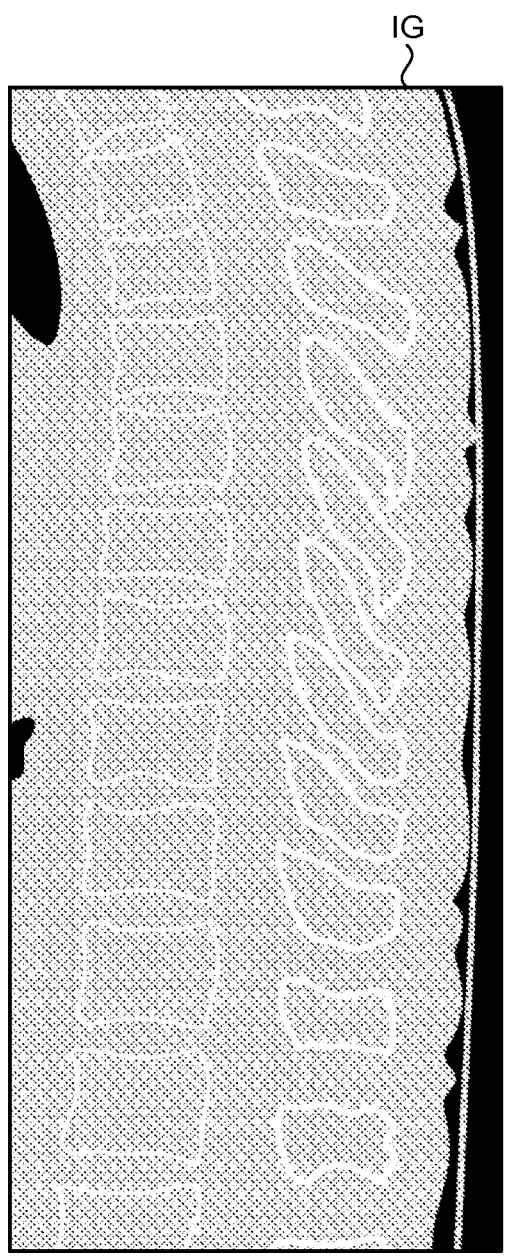
FIG. 4 illustrates an example of CT image data in which a spine of a subject is captured according to one embodiment.

A process performed by the extraction function 152 will be described below by using an example in which CT image data in which a first thoracic vertebra T1 to a ninth thoracic vertebra T9 are captured is input as the medical image data to the landmark extraction model. FIG. 4 illustrates an example of the CT image data in which a spine of a subject is captured. The extraction function 152 inputs CT image data IG to the landmark extraction model that is stored in a storage apparatus of an external workstation via the NW interface 110.

The landmark extraction model outputs, in response to the input of the CT image data IG, pieces of coordinate information on a feature point T1 to a feature point T9, which correspond to the first thoracic vertebra T1 to the ninth thoracic vertebra T9 and which are a plurality of anatomical landmarks present in the CT image data IG, and T1 to T9 that represent the first thoracic vertebra T1 to the ninth thoracic vertebra T9, in an associated manner.

For example, the landmark extraction model outputs labels for identifying the feature points (anatomical landmarks), such as "T1(x1, y1, z1), T2(x2, y2, z2), . . . T9(x9, y9, z9)" (see FIG. 5), and text data that represents coordinates of the feature points. Meanwhile, the coordinate information and the label may be output as data in a certain format that is recordable as supplementary information of DICOM.

The extraction function 152 extracts, via the NW interface 110, the coordinate information and the label of each of the anatomical landmarks that are output from the landmark extraction model. The extraction function 152 extracts the anatomical landmarks by plotting the anatomical landmarks at positions corresponding to the pieces of coordinate information on the medical image data IG on the basis of the acquired coordinate information and adding the labels associated with the anatomical landmarks.

Figure 5:
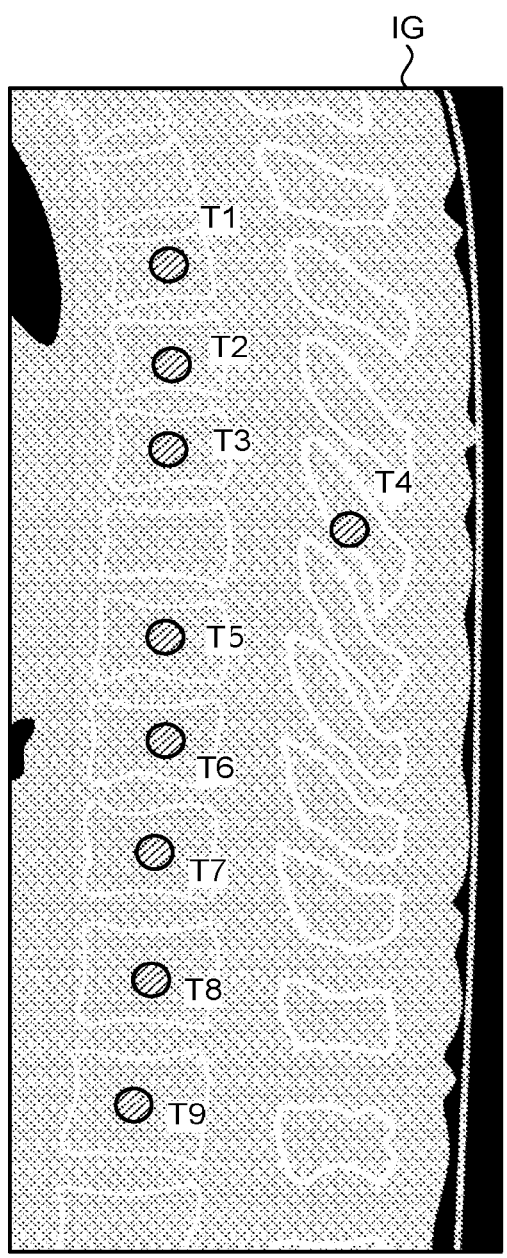
FIG. 5 is a diagram for explaining an example of a process of extracting positions of the anatomical landmarks according to one embodiment.

FIG. 5 is a diagram illustrating an example of an extraction result of the anatomical landmarks. As illustrated in FIG. 5, the extraction function 152 extracts the feature points T1 to T9 on the medical image data IG, while adding the labels for identifying the respective feature points.

Meanwhile, in the method of extracting the anatomical landmarks as described above, data that represents a relationship, such as continuity, between all of the anatomical landmarks is not used to derive the extraction result. Therefore, the individual anatomical landmark is extracted independently. Consequently, for example, in some cases, only a part of anatomical landmarks that are related to one another may be erroneously detected.

For example, in FIG. 5, the feature point T4 corresponding to the fourth thoracic vertebra among the feature points T1 to T9 that are extracted as the anatomical landmarks is extracted at a position that is different from the position of the fourth thoracic vertebra on the medical image data IG. In this manner, in the conventional method of extracting anatomical landmarks, only a part of continuous anatomical landmarks as a group may be erroneously detected in some cases.

To cope with this, the medical image processing apparatus 100 according to the present embodiment sets a landmark group that represents a plurality of anatomical landmarks that have a certain relationship determined in advance, and corrects the positions of the anatomical landmarks on the medical image data based on the relationship between all of the anatomical landmarks in the landmark group. A configuration related to a process of correcting the positions of the anatomical landmarks on the medical image data will be described below.

The identification function 153 identifies a landmark group to which the anatomical landmarks that are extracted by the extraction function 152 belong, from among landmark groups in which a plurality of anatomical landmarks that are grouped based on anatomical tissue and relationship information that defines physical relationships among the anatomical landmarks are associated.

Group setting information for making a group of anatomical landmarks will be described below. The group setting information is, for example, a data table in which the labels of a plurality of anatomical landmarks, the relationship information, such as continuity information or pixel value appropriateness information (to be described later), and the landmark group name are associated with one another. Specifically, the group setting information is information in which "anatomical landmarks: T1, T2, . . . T9", "relationship information: continuity information corresponding to T1, T2, . . . T9", "relationship information: pixel value appropriateness information corresponding to T1, T2, . . . T9", and a "landmark group: thoracic vertebra" are associated with one another.

The identification function 153 refers to the group setting information, and identifies a landmark group with a group name corresponding to the label that is added to each of the anatomical landmarks in the extraction process performed by the extraction function 152, as the landmark group to which the anatomical landmark belongs.

When the landmark group of the feature point T1 is to be identified in the example illustrated in FIG. 5, the identification function 153 refers to the group setting information and identifies a "landmark group: thoracic vertebra" that corresponds to "T1" as the landmark group.

The first calculation function 154 calculates a continuity appropriateness index of each of the anatomical landmarks that are extracted by the extraction function 152 on the basis of the continuity information that defines continuity among all of the anatomical landmarks that belong to the same landmark group. The continuity appropriateness index is an index that indicates a degree of appropriateness of the continuity among the anatomical landmarks.

Here, the continuity information is, for example, information in which the anatomical landmarks that are grouped, a standard regression curve, a standard slope value between the adjacent anatomical landmarks, and a threshold for the continuity appropriateness index are associated with one another. The continuity information is stored as, for example, information included in the group setting information in the memory 120.

The standard regression curve is, for example, a regression curve that is obtained by performing regression analysis on the plurality of anatomical landmarks that belong to the same landmark group with respect to a plurality of subjects, and averaging the plurality of obtained regression curves. Further, the standard regression curve includes information on the position of each of the anatomical landmarks on the standard regression curve. The standard regression curve is set for each of the landmark groups.

The standard slope value is, for example, a value that represents a slop of a straight line that connects the adjacent anatomical landmarks on the standard regression curve. The standard slope value is set for each of straight lines that connect the adjacent anatomical landmarks.

The threshold for the continuity appropriateness index is a threshold for determining whether the continuity is appropriate with respect to the plurality of anatomical landmarks that are extracted by the extraction function 152. The threshold for the continuity appropriateness index is set for each of the straight lines that connect the adjacent anatomical landmarks.

In the example illustrated in FIG. 5, when the continuity appropriateness indices of the feature points T1 to T9 are to be calculated, the first calculation function 154 refers to the continuity information in the group setting information that is stored in the memory 120, and identifies the standard regression curve that is set for the "landmark group: thoracic vertebra" and the standard slope value that is set for each set of the adjacent anatomical landmarks.

Subsequently, the first calculation function 154 calculates, as the continuity appropriateness index, a ratio between a slope value between the adjacent anatomical landmarks extracted on the medical image data IG and the standard slope value between the corresponding anatomical landmarks on the standard regression curve.

In the example illustrated in FIG. 5, the first calculation function 154 calculates eight slope values, such as the slope value of the straight line connecting the feature point T1 and the feature point T2, the slope value of the straight line connecting the feature point T2 and the feature point T3, . . . the slope value of the straight line connecting the feature point T8 and the feature point T9. Then, the first calculation function 154 calculates, as the continuity appropriateness indices, ratios between the calculated eight slope values and corresponding standard slope values.

Here, if the ratio between the calculated slope value and the standard slope value approaches 1, a relative positional relationship between the extracted adjacent anatomical landmarks approaches a relative positional relationship between the adjacent anatomical landmarks on the standard regression curve. Therefore, as the ratio between the calculated slope value and the standard slope value approaches 1, the degree of appropriateness related to the continuity among the anatomical landmarks increases.

The second calculation function 155 calculates the pixel value appropriateness index of each of the anatomical landmarks that are extracted by the extraction function 152, on the basis of the pixel value appropriateness information that defines a relationship between pixel values of all of the anatomical landmarks belonging to the same landmark group on the medical image. The pixel value appropriateness index is an index that represents the degree of appropriateness related to a relative relationship of pixel values between the anatomical landmarks.

Here, the pixel value appropriateness information is, for example, information in which a standard relative pixel value between the adjacent anatomical landmarks among the grouped anatomical landmarks and a threshold for the pixel value appropriateness index are associated. The pixel value appropriateness information is stored as, for example, information included in the group setting information in the memory 120.

The standard relative pixel value is obtained by, for example, calculating, with respect to a plurality of subjects, relative pixel values each representing a ratio of average values of pixel values of a plurality of pixels (for example, pixels within a radius n from a center coordinate of the anatomical landmark) corresponding to anatomical landmarks between adjacent anatomical landmarks that belong to the same landmark group, and averaging the plurality of obtained relative pixel values.

The threshold for the pixel value appropriateness index is a threshold for determining whether the relationship between the pixels values is appropriate with respect to the plurality of anatomical landmarks that are extracted by the extraction function 152. The threshold for the pixel value appropriateness index is set for each set of the two adjacent anatomical landmarks.

In the example illustrated in FIG. 5, when the pixel value appropriateness indices of the feature point T1 to T9 are to be calculated, the second calculation function 155 refers to the pixel value appropriateness information in the group setting information that is stored in the memory 120, and identifies the standard relative pixel value that is set for each set of the adjacent anatomical landmarks in the "landmark group: thoracic vertebra".

Subsequently, the second calculation function 155 calculates, as the pixel value appropriateness index, a ratio of the relative pixel value between the adjacent anatomical landmarks that are extracted on the medical image data IG and the standard relative pixel value corresponding to the adjacent anatomical landmarks.

In the example illustrated in FIG. 5, the second calculation function 155 calculates eight relative pixel values, such as the relative pixel value between the feature point T1 and the feature point T2, the relative pixel value between the feature point T2 and the feature point T3, . . . the relative pixel value between the feature point T8 and the feature point T9. Further, the second calculation function 155 calculates, as the pixel value appropriateness index, ratios between the calculated eight relative pixel values and the standard relative pixel values corresponding to the respective relative pixel values.

The correction function 156 corrects the positions of the anatomical landmarks that are extracted by the extraction function 152, on the basis of the relationship information on the landmark group that is identified by the identification function 153. For example, the correction function 156 corrects the positions of the extracted anatomical landmarks based on the continuity information and the continuity appropriateness index that is calculated by the first calculation function 154.

Specifically, the correction function 156 refers to the continuity information in the group setting information that is stored in the memory 120, and checks whether one or more continuity indices among the plurality of continuity appropriateness indices that are calculated by the first calculation function 154 exceeds the threshold that is registered in the continuity information. If one or more continuity indices exceed the threshold, the correction function 156 corrects the positions of the anatomical landmarks such that the slope values calculated by the first calculation function 154 approach the standard slope value that is registered in the continuity information.

Meanwhile, in the present embodiment, if all of the continuity appropriateness indices that are calculated by the first calculation function 154 do not exceed the threshold, the correction function 156 does not perform the process of correcting the positions of the anatomical landmarks on the medical image data IG.

Figure 6:
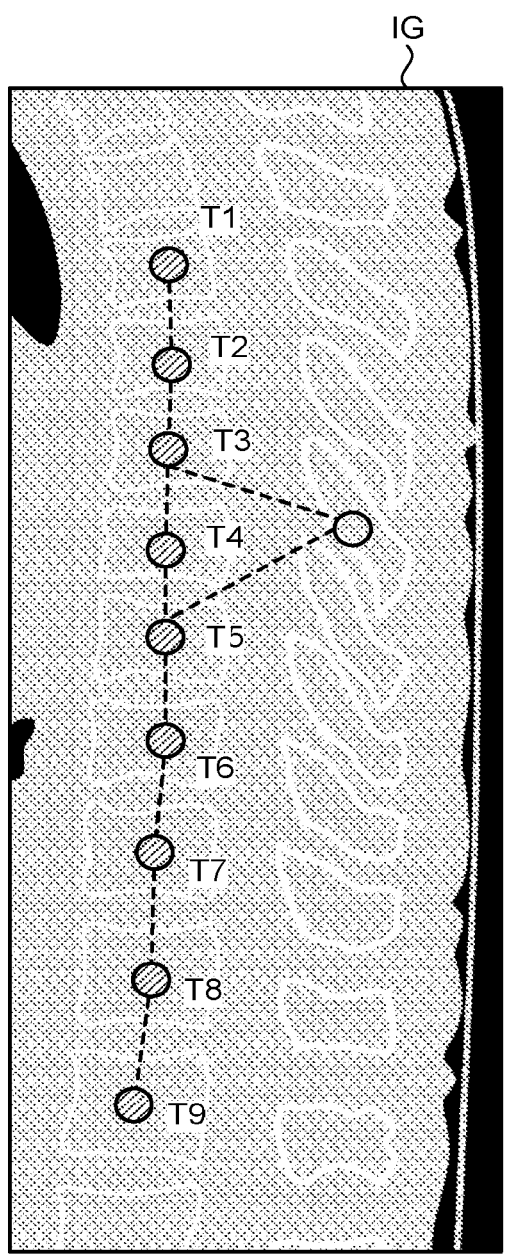
FIG. 6 is a diagram for explaining an example of a process of correcting the positions of the anatomical landmarks according to one embodiment.

FIG. 6 is a diagram for explaining the process of correcting the positions of the anatomical landmarks. FIG. 6 illustrates one example of the process of correcting the positions of the feature points T1 to T9 extracted in FIG. 5. As a premise, in FIG. 5, it is assumed that the continuity appropriateness index of the straight line connecting the feature point T3 and the feature point T4 and the continuity appropriateness index of the straight line connecting the feature point T4 and the feature point T5 exceed the threshold that is registered in the continuity information.

Therefore, the correction function 156 corrects the position of the feature point T4 such that both of the continuity appropriateness index of the straight line connecting the feature point T3 and the feature point T4 and the continuity appropriateness index of the straight line connecting the feature point T4 and the feature point T5 are minimized.

Further, for example, the correction function 156 corrects the positions of the anatomical landmarks that have been corrected based on the continuity appropriateness indices, on the basis of the pixel value appropriateness index calculated by the second calculation function 155.

Specifically, the correction function 156 refers to the pixel value appropriateness information in the group setting information that is stored in the memory 120, and checks whether one or more pixel value appropriateness indices among the plurality of pixel value appropriateness indices calculated by the second calculation function 155 exceed the threshold that is registered in the pixel value appropriateness information.

If one or more pixel value appropriateness indices exceeds the threshold, the correction function 156 corrects the position of each of the anatomical landmarks such that, in a predetermined range (for example, within pixels located in a range of the radius n from the central coordinate of each of the extracted anatomical landmarks), the relative pixel value of the adjacent anatomical landmarks most approaches the standard relative pixel value that is registered in the pixel value appropriateness information.

Meanwhile, in the present embodiment, first correction is performed based on the continuity appropriateness index, and second correction is performed based on the pixel value appropriateness index; however, the second correction based on the pixel value appropriateness index need not always be performed.

The display control function 157 causes the display 140 to display various kinds of information. For example, the display control function 157 causes the display 140 to display the position of each of the anatomical landmarks that are not yet corrected and the corrected positions of the respective landmarks as illustrated in FIG. 6. With this configuration, the user is able to easily understand what correction is performed.

The reception function 158 receives various kinds of operation from the user. For example, the reception function 158 receives a modification instruction about the positions of the landmarks on the medical image. The modification instruction is input if the user who has checked the correction result determines that appropriate correction has not been performed. In this case, the correction function 156 corrects the positions of the anatomical landmarks again in accordance with the modification instruction input by the user.

The retraining function 159 generates retraining data for the landmark extraction model. Further, the retraining function 159 outputs the generated retraining data set to the training apparatus. Specifically, the retraining function 159 generates the retraining data set by adopting the medical image data IG that is acquired by the acquisition function 151 as input-side teacher data and the pieces of coordinate information and the labels of the anatomical landmarks that are corrected by the correction function 156 as output-side teacher data.

Furthermore, the retraining function 159 outputs the generated retraining data set to an external training apparatus via the NW interface 110. The training apparatus performs retraining of the landmark extraction model by using the retraining data set. Therefore, it is possible to improve extraction accuracy of the anatomical landmarks.

A process performed by the medical image processing apparatus 100 that is configured as described above will be described below. FIG. 7 is a flowchart illustrating an example of the process performed by the medical image processing apparatus 100.

First, the acquisition function 151 acquires the medical image data IG of a subject to be diagnosed (S1). Specifically, the acquisition function 151 acquires the medical image data IG corresponding to a patient ID of the subject to be diagnosed from the medical image storage apparatus 500.

Subsequently, the extraction function 152 extracts a plurality of anatomical landmarks from the acquired medical image data IG (Step S2). Specifically, the extraction function 152 inputs the medical image data IG to the landmark extraction model. Then, the extraction function 152 extracts a plurality of anatomical landmarks based on the pieces of coordinate information and the labels that represent the anatomical landmarks output from the landmark extraction model.

Subsequently, the identification function 153 identifies a landmark group to which the extracted anatomical landmarks belong (Step S3). Specifically, the identification function 153 refers to the group setting information and identifies, as the landmark group to which the extracted anatomical landmarks belong, a landmark group that correspond to the labels of the extracted anatomical landmarks.

Subsequently, the first calculation function 154 calculates the continuity appropriateness index (Step S4). Specifically, the first calculation function 154 calculates the slope value of the straight line that connects a specific anatomical landmark and an anatomical landmark that is adjacent to the specific anatomical landmark among the plurality of extracted anatomical landmarks.

Subsequently, the first calculation function 154 refers to the continuity information in the group setting information and identifies the standard regression curve and the standard slope value of the landmark group to which the extracted anatomical landmarks belong. Further, the first calculation function 154 calculates a ratio between the calculated slope value and the standard slope value as the continuity appropriateness index.

Then, the correction function 156 checks whether the continuity appropriateness index that is calculated by the first calculation function 154 exceeds the threshold (Step S5). Specifically, the correction function 156 refers to the continuity information in the group setting information and checks whether the plurality of continuity appropriateness indices that are calculated by the first calculation function 154 exceed the threshold for the continuity index that is set for each set of the adjacent anatomical landmarks in the landmark group to which the extracted anatomical landmarks belong.

If the continuity appropriateness index does not exceed the threshold (Step S5: No), the process is terminated. In contrast, if the continuity appropriateness index exceeds the threshold (Step S5: Yes), the correction function 156 corrects the positions of the extracted anatomical landmarks on the medical image data IG (Step S6).

Specifically, the correction function 156 performs, as a first stage, a correction process of correcting the position of each of the extracted anatomical landmarks based on the continuity information stored in the memory 120 and the calculated continuity appropriateness index.

Subsequently, the second calculation function 155 calculates the pixel value appropriateness index (Step S7). Specifically, the second calculation function 155 calculates the relative pixel value between the adjacent anatomical landmarks among the plurality of extracted anatomical landmarks.

Then, the correction function 156 checks whether the pixel value appropriateness index that is calculated by the second calculation function 155 exceeds the threshold (Step S8). Specifically, the correction function 156 refers to the pixel value appropriateness information in the group setting information and checks whether the plurality of pixel value appropriateness indices that are calculated by the second calculation function 155 exceeds the threshold for the pixel value appropriateness index, which is set for each set of the adjacent anatomical landmarks, in the landmark group to which the extracted anatomical landmarks belong.

If the pixel value appropriateness index does not exceed the threshold (Step S8: No), the process is terminated. In contrast, if the pixel value appropriateness index exceeds the threshold (Step S8: Yes), the correction function 156 corrects the positions of the anatomical landmarks that are subjected to the first correction process on the medical image data IG (Step S9).

Subsequently, the second calculation function 155 refers to the pixel value appropriateness information in the group setting information and identifies the standard relative pixel value of the landmark group to which the extracted anatomical landmarks belong. Further, the second calculation function 155 calculates, as the pixel value appropriateness index, a ratio between the calculated relative pixel value and the standard relative pixel value.

Specifically, the correction function 156 performs, as a second stage, a correction process of correcting the position of each of the anatomical landmarks that have been corrected based on the continuity information, on the basis of the pixel value appropriateness information stored in the memory 120 and the calculated pixel value appropriateness index.

Subsequently, the display control function 157 performs control of displaying the medical image data IG that represents the corrected positions of the anatomical landmarks (Step S10). Specifically, the display control function 157 performs control of displaying the positions of the anatomical landmarks that are not yet corrected and the corrected positions of the anatomical landmarks on the medical image data IG in a distinguishable manner.

Then, the reception function 158 checks whether input of the modification instruction on the positions of the anatomical landmarks is received from the user within a predetermined time (Step S11). If the input of the modification instruction is not received within the predetermined time (Step S11: No), the retraining function 159 generates the retraining data in accordance with the details of the correction process performed by the correction function 156 (Step S14).

Specifically, the retraining function 159 generates the retraining data set by adopting the medical image data IG that is acquired by the acquisition function 151 as input-side teacher data and the pieces of coordinate information and the labels of the anatomical landmarks that are corrected by the correction process performed by the correction function 156 as output-side teacher data. Subsequently, the retraining function 159 outputs the generated retraining data to an external training apparatus and terminates the process.

In contrast, if the input of the modification information is received within the predetermined time (Step S11: Yes), the correction function 156 corrects the positions of the anatomical landmarks again in accordance with details of the modification instruction input from the user (Step S12). Subsequently, the retraining function 159 generates the retraining data in accordance with the details of the modification instruction input by the user (Step S13).

Specifically, the retraining function 159 generates a retraining data set by adopting the medical image data IG that is acquired by the acquisition function 151 as input-side teacher data and the pieces of coordinate information and the labels of the anatomical landmarks that have been corrected in accordance with the input of the modification instruction received by the reception function 158 as output-side teacher data. Subsequently, the retraining function 159 outputs the generated retraining data set to an external training apparatus and terminates the process.

As described above, the medical image processing apparatus 100 according to the present embodiment extracts the plurality of anatomical landmarks from the medical image data IG, and identifies the landmark group to which each of the anatomical landmarks belongs. Further, the medical image processing apparatus 100 according to the present embodiment corrects the positions of the extracted anatomical landmarks on the medical image data IG on the basis of the positional relationship between the anatomical landmarks that belong to the identified landmark group.

With this configuration, even if a part of the plurality of anatomical landmarks is erroneously detected, the medical image processing apparatus 100 is able to correct the positions of the anatomical landmarks in accordance with a positional relationship between the anatomical landmarks, so that it is possible to improve extraction accuracy of the anatomical landmarks. Further, the positions of the anatomical landmarks on the medical image data IG are corrected in accordance with a relationship of an image in the vicinity of the anatomical landmarks that belong to the same landmark group, so that the medical image processing apparatus 100 is able to perform correction while reflecting features of the anatomical landmarks that belong to the landmark group. In other words, according to the medical image processing apparatus 100 of the present embodiment, it is possible to improve detection accuracy of the anatomical landmarks.

Furthermore, the medical image processing apparatus 100 according to the present embodiment corrects the positions of the anatomical landmarks in accordance with the continuity information that defines the continuity among all of the anatomical landmarks that belong to the same landmark group. With this configuration, the medical image processing apparatus 100 is able to perform correction while taking into account continuity of curved lines that connect the plurality of anatomical landmarks belonging to the same landmark group.

Moreover, the medical image processing apparatus 100 according to the present embodiment corrects the positions of the anatomical landmarks in accordance with the pixel value appropriateness information that defines a relationship among the pixel values of all of the anatomical landmarks belonging to the same landmark group. With this configuration, the medical image processing apparatus 100 is able to perform correction while taking into account a relationship among the pixel values of the plurality of anatomical landmarks that belong to the same landmark group.

Furthermore, the medical image processing apparatus 100 according to the present embodiment causes the display 140 to display the position of each of the anatomical landmarks that are not yet subjected to the correction process and the position of each of the landmarks that are subjected to the correction process. With this configuration, the user is able to easily understand the correction performed by the medical image processing apparatus 100.

Moreover, the medical image processing apparatus 100 according to the present embodiment, upon receiving input of modification of the corrected position of each of the anatomical landmarks, performs a process of correcting the position of each of the anatomical landmarks again in accordance with the input of the modification. With this configuration, even if the anatomical landmarks are extracted at erroneous positions even after the correction process is performed, the medical image processing apparatus 100 is able to correct the positions of the anatomical landmarks on the medical image data IG in accordance with the instruction given by the user.

Furthermore, the medical image processing apparatus 100 according to the present embodiment generates the retraining data that includes the medical image data IG and the corrected position of each of the anatomical landmarks, and outputs the retraining data. With this configuration, the medical image processing apparatus 100 is able to retrain the landmark extraction model that is used for the extraction process by an external training apparatus or the like. By the retraining, if the medical image data IG that is similar to the medical image data IG in which the positions of the anatomical landmarks are erroneously detected is input, the possibility that the positions of the anatomical landmarks are erroneously detected is reduced. Therefore, the medical image processing apparatus 100 according to the present embodiment is able to improve the extraction accuracy of the anatomical landmarks using the landmark extraction model.

Meanwhile, the embodiment as described above may be appropriately modified by changing a part of the configuration or the functions of each of the apparatuses. Therefore, in the following, some modifications of the embodiment as described above will be described as other embodiments. Meanwhile, in the following, differences from the embodiment as described above will be mainly explained, and detailed explanation of the common details as described above will be omitted. Furthermore, the modifications described below may be implemented individually or by being combined appropriately.

Modification

In the embodiment as described above, the mode has been described in which the medical image processing apparatus 100 performs the process of extracting the anatomical landmarks. However, the apparatus that performs the process of extracting the anatomical landmarks is not limited to the medical image processing apparatus 100. For example, the medical image diagnostic apparatus 200 may perform the process of extracting the anatomical landmarks.

If the medical image diagnostic apparatus 200 is an X-ray CT apparatus, for example, processing circuitry of a console apparatus included in the X-ray CT apparatus performs the process of extracting the anatomical landmarks. In this case, the processing circuitry inputs CT image data that is captured or reconstructed by the X-ray CT apparatus to the landmark extraction model that is stored in an external work station or the like. Then, the processing circuitry acquires the coordinate information and the label of each of anatomical landmarks output from the landmark extraction model.

Furthermore, the processing circuitry performs a process of recording the acquired coordinate information and the acquired label of each of the anatomical landmarks as supplementary information of DICOM of the CT image data. The processing circuitry transmits the CT image data for which the coordinate information and the label of each of the anatomical landmarks is recorded as the supplementary information of DICOM to the medical image storage apparatus 500.

Meanwhile, the processing circuitry may perform the correction process on the positions of the anatomical landmarks on the medical image data IG. In this case, the processing circuitry records the coordinate information and the label of each of the anatomical landmarks that are subjected to the correction process as the supplementary information of DICOM of the CT image data.

Furthermore, the processing circuitry may generate text data that represents information on the acquired coordinate information and the label of each of the anatomical landmarks. In this case, the processing circuitry transmits the text data together with the CT image data to the medical image storage apparatus 500.

In the present embodiment, the acquisition function 151 of the medical image processing apparatus 100 is able to acquire the CT image data (medical image data) for which the coordinate information and the label of the anatomical landmark is recorded as the supplementary information of DICOM.

Therefore, the medical image processing apparatus 100 according to the present modification is able to plot the anatomical landmarks at positions corresponding to the pieces of coordinate information on the medical image data IG and add the labels associated with the anatomical landmarks without communicating with an external workstation or the like that stores therein the landmark extraction model. In other words, according to the present modification, it is possible to reduce a processing load on the medical image processing apparatus 100 and efficiently extract the anatomical landmarks with high accuracy.

According to at least one of the embodiments as described above, it is possible to improve detection accuracy of anatomical landmarks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
    processing circuitry that
        extracts, from a medical image, anatomical landmarks that represent feature points of a spine included in the medical image,
        identifies a landmark group to which the extracted anatomical landmarks belong from among landmark groups, in each of which a set of anatomical landmarks that are grouped based on the spine and a regression curve are associated, the regression curve indicating continuity information that defines continuity among all of the anatomical landmarks that belong to a same landmark group as relationship information that defines a physical relationship between the set of anatomical landmarks,
        calculates, based on the regression curve of the identified landmark group, a continuity appropriateness index that is an index indicating a degree of appropriateness of continuity between each pair of anatomical landmarks in the extracted anatomical landmarks, and
        corrects, based on the continuity appropriateness index, a position of an anatomical landmark, among the extracted anatomical landmarks, that does not satisfy the continuity defined by the regression curve to move toward a position that satisfies the continuity.

2. The medical image processing apparatus according to claim 1, wherein the processing circuitry corrects the positions of the extracted anatomical landmarks on the medical image based on the relationship information, which includes pixel value appropriateness information that defines a relationship among pixels value of all of the anatomical landmarks belonging to the identified landmark group on the medical image.

3. The medical image processing apparatus according to claim 2, wherein
    the processing circuitry calculates a pixel value appropriateness index of each of the extracted anatomical landmarks based on the pixel value appropriateness information, and
    the pixel value appropriateness index is an index that represents a degree of appropriateness related to a relative relationship of pixel values between anatomical landmarks, the pixel value appropriateness index including a relative pixel value between adjacent anatomical landmarks.

4. The medical image processing apparatus according to claim 3, wherein
    the pixel value appropriateness information is information in which, with each two anatomical landmarks adjacent to each other, the landmark group, a standard relative pixel value between the adjacent anatomical landmarks, and a second threshold for the pixel value appropriateness index are associated, and
    the second threshold is a threshold for determining whether the relative relationship of pixel values is appropriate with respect to the plurality of extracted anatomical landmarks.

5. The medical image processing apparatus according to claim 4, wherein
    when the calculated pixel value appropriateness index exceeds the second threshold associated with the identified landmark group in the pixel value appropriateness information, the processing circuitry corrects the positions of the extracted anatomical landmarks such that the calculated relative pixel value between the adjacent anatomical landmarks approaches the standard relative pixel value corresponding to the calculated relative pixel value between the adjacent anatomical landmarks in the pixel value appropriateness information, the corrected positions on the medical image being different from the positions before the correction.

6. The medical image processing apparatus according to claim 1, wherein the processing circuitry causes a display apparatus to display a position of each of anatomical landmarks that are not yet corrected and a corrected position of each of the extracted anatomical landmarks.

7. The medical image processing apparatus according to claim 6, wherein when input of a modification of the corrected position of each of the extracted anatomical landmarks is received, the processing circuitry corrects the positions of the extracted anatomical landmarks on the medical image in accordance with the input of the modification.

8. The medical image processing apparatus according to claim 1, wherein the processing circuitry
    extracts the anatomical landmarks by inputting data of the medical image to a trained model that is one of a machine learning model and a deep learning model that outputs a plurality of anatomical landmarks,
    generates retraining data that includes the medical image and the corrected position of each of the extracted anatomical landmarks, and
    outputs the retraining data.

9. The medical image processing apparatus according to claim 1, wherein the continuity information is a standard regression curve.

10. The medical image processing apparatus according to claim 9, wherein
- the standard regression curve is a regression curve that is obtained by performing regression analysis on the plurality of anatomical landmarks that belong to the same landmark group with respect to a plurality of subjects and averaging the plurality of obtained regression curves, the standard regression curve including information on a position of each of the anatomical landmarks on the standard regression curve, and
- the standard regression curve is set for each of the landmark groups.

11. The medical image processing apparatus according to claim 10, wherein
- the continuity information is information in which the landmark group, the standard regression curve, a standard slope value between adjacent anatomical landmarks, and a first threshold for the continuity appropriateness index are associated with one another,
- the standard slope value is a value that represents a slop of a straight line that connects the adjacent anatomical landmarks on the standard regression curve,
- the first threshold is a threshold for determining whether the continuity is appropriate with respect to the plurality of extracted anatomical landmarks, and
- the processing circuitry
  - calculates a slope value between adjacent anatomical landmarks of the extracted anatomical landmarks and calculates a ratio between the calculated slope value and the standard slope value between the corresponding anatomical landmarks on the standard regression curve as the continuity appropriateness index, and
  - when the calculated continuity appropriateness index exceeds the first threshold associated with the identified landmark group in the continuity information, corrects the positions of the extracted anatomical landmarks on the medical image based on the standard slope value associated with the identified landmark group, the corrected positions on the medical image being different from the positions before the correction.

12. The medical image processing apparatus according to claim 11, wherein
- the first threshold is set for each straight line that connects adjacent anatomical landmarks, and
- when the calculated continuity appropriateness index exceeds the first threshold associated with the identified landmark group in the continuity information, the processing circuitry corrects the positions of the extracted anatomical landmarks on the medical image such that the calculated slope value approaches the standard slope value associated with the identified landmark group in the continuity information, the corrected positions on the medical image being different from the positions before the correction.

13. The medical image processing apparatus according to claim 1, wherein the processing circuitry causes a display apparatus to display the corrected positions of the extracted anatomical landmarks.

14. The medical image processing apparatus according to claim 13, wherein the processing circuitry causes the display apparatus to display positions of all of the anatomical landmarks, including the corrected anatomical landmarks, that belong to the identified landmark group.

15. The medical image processing apparatus according to claim 1, wherein the processing circuitry performs correction by changing the positions of the extracted anatomical landmarks on the medical image to different positions on the medical image based on the relationship information.

* * * * *